(12) United States Patent
Shoa et al.

(10) Patent No.: US 10,885,920 B2
(45) Date of Patent: Jan. 5, 2021

(54) METHOD AND SYSTEM FOR SEPARATING AND AUTHENTICATING SPEECH OF A SPEAKER ON AN AUDIO STREAM OF SPEAKERS

(71) Applicant: NICE LTD, Ra'anana (IL)

(72) Inventors: Alon Menahem Shoa, Tel-Aviv (IL); Roman Frenkel, Ashdod (IL); Matan Keret, Oulu (FI)

(73) Assignee: NICE LTD, Ra'anana (IL)

( * ) Notice: Subject to any disclaimer, the term of this patent is extended or adjusted under 35 U.S.C. 154(b) by 228 days.

(21) Appl. No.: 16/236,655

(22) Filed: Dec. 31, 2018

(65) Prior Publication Data
US 2020/0211571 A1   Jul. 2, 2020

(51) Int. Cl.
*G10L 17/22* (2013.01)

(52) U.S. Cl.
CPC .................................. *G10L 17/22* (2013.01)

(58) Field of Classification Search
CPC ...................................................... G10L 17/22
See application file for complete search history.

(56) References Cited

U.S. PATENT DOCUMENTS

| | | | |
|---|---|---|---|
| 2013/0246064 A1* | 9/2013 | Wasserblat | G10L 25/78 704/244 |
| 2014/0348308 A1* | 11/2014 | Krause | H04M 3/523 379/88.02 |
| 2017/0061968 A1* | 3/2017 | Dalmasso | G10L 17/08 |
| 2018/0205823 A1* | 7/2018 | Horton | H04M 3/537 |

* cited by examiner

*Primary Examiner* — Sonia L Gay
(74) *Attorney, Agent, or Firm* — Soroker Agmon Nordman

(57) ABSTRACT

A method for separating and authenticating speech of a speaker on an audio stream of speakers over an audio channel may include receiving audio stream data of the audio stream with speech from a speaker to be authenticated speaking with a second speaker. A voiceprint may be generated for each data chunk in the audio stream data divided into a plurality of data chunks. The voiceprint for each data chunk may be assessed as to whether the voiceprint has speech belonging to the speaker to be authenticated or to the second speaker using representative voiceprints of both speakers. An accumulated voiceprint may be generated using the verified data chunks with speech of the speaker to be authenticated. The accumulated voiceprint may be compared to the reference voiceprint of the speaker to be authenticated for authenticating the speaker speaking with the second speaker over the audio channel.

34 Claims, 9 Drawing Sheets

METHOD AND SYSTEM FOR SEPARATING AND AUTHENTICATING SPEECH OF A SPEAKER ON AN AUDIO STREAM OF SPEAKERS

FIELD OF THE INVENTION

The present invention relates to voice biometrics, and more specifically to method and system for separating and authenticating speech of a speaker on an audio stream of speakers.

BACKGROUND OF THE INVENTION

A company may use customer call centers to provide customer service for their products and/or services. Customer calls to customer call centers may take place over an audio stream, such as a monophonic audio stream where there are multiple speakers speaking on the same monophonic audio stream, typically the customer agent and the customer. In order to prevent hackers and/or criminals from obtaining personal data and/or business information about the company and/or company customers, authentication of the customer on the call may be used. Furthermore, in some call scenarios where the recording is stereophonic, speakers may change during the call such as a secretary calling on behalf of a boss, fraudsters, and a person passes the phone to a friend or sibling, for example. Separating the speakers, such as the customer and the customer agent, for example, on the audio stream is needed to be able to authenticate the voice of the customer.

Some techniques for speaker voice separation on an audio stream may utilize conventional diarization algorithms. However, diarization algorithms may be unstable. For example, once the diarization algorithm is applied to the audio stream and a small segment is added, the results for separating the speakers may be completely different. For example, diarization of a 10 second segment may result in 7 seconds for one speaker and 3 seconds for the other speaker. Adding an additional second to the total segment, e.g., 11 seconds in total, may result in 5 seconds for one speaker and 6 seconds for the second speaker. Since the separation behavior may be affected by segment length, a 15 second sample of the call may be sent to the diarization algorithm, which may cause a delay in the separation and any audio analytics operation, such as an authentication operation, of the customer's voice or speech on the audio stream, for example.

Today there are several approaches to distinguish between different speakers on an audio stream. Some of them are model-based (e.g., Gaussian Mixture Models (GMM) and Joint Factor Analysis (JFA)). Some approaches may be derived directly from the vocal features (e.g., Mel-frequency cepstral coefficients (MFCC), prosody, temporal, spectral) and other approaches may use various clustering approaches (e.g., nearest neighbors (NN). K-Means, mean-shift, Hierarchical).

There are also parametric and non-parametric approaches to distinguish between speakers on an audio stream. A parametric approach may include when there is a known and predefined number of parameters to analyze in the audio stream. A non-parametric may include determining the number of parameters by observation, such as for example, the speech duration.

Another approach to distinguishing between speakers on an audio stream is merging different algorithms to come to a joint decision regarding the authentication of the speaker (e.g., the customer). In this case, it may be preferable that the algorithms may be complementary and focus on different domains.

Currently a list of solutions for distinguishing between speakers on an audio stream for speaker separation may include: ALIZE, an open source program that uses GMM and Hidden Markov Models (HMM); NX, a diarization solution that is used with the Fluent Real Time Authentication (RTA); and LIUM, a university open source that uses Bayesian Information Criterion (BIC).

However, the above-mentioned authentication solutions are based on speaker separation using diarization, which is not a stable speaker separation method and is very sensitive to different inputs, or the solutions may not be able to be applied in real time.

Thus, there may be a desire for a method and a system for a real time separation and authentication of a speaker on an audio stream of speakers that avoids conventional diarization.

SUMMARY OF THE INVENTION

There is thus provided, in accordance with some embodiments of the present invention, a method for separating and authenticating speech of a speaker on an audio stream of speakers over an audio channel may include, in a processor, receiving audio stream data of an audio stream with speech from a speaker to be authenticated speaking with a second speaker over an audio channel, and representative voiceprints of the speaker to be authenticated and the second speaker. The audio stream data may be divided by the processor into a plurality of data chunks having a predefined time interval. A voiceprint may be generated by the processor for each data chunk in said plurality of data chunks in which speech is detected. The voiceprint for each data chunk from a start of the audio stream data may be successively assessed by the processor as to whether the voiceprint for each data chunk has speech belonging to the speaker to be authenticated or to the second speaker using the representative voiceprints, and upon verifying by the processor that the voiceprint for the assessed data chunk has speech belonging to the speaker to be authenticated, the clock counter may be incremented by the predefined time interval. When the clock counter has a time value greater than a predefined threshold, an accumulated voiceprint may be generated by the processor using the verified data chunks of the speaker to be authenticated. The accumulated voiceprint may be compared by the processor to the representative voiceprint of the speaker to be authenticated, so as to authenticate the speaker speaking with the second speaker over the audio channel.

Furthermore, in accordance with some embodiments of the present invention, successively assessing the voiceprint for each data chunk may include computing for the voiceprint of each data chunk, a first similarity score for the speaker to be authenticated and a second similarity score for the second speaker.

Furthermore, in accordance with some embodiments of the present invention, successively assessing the voiceprint for each data chunk may include applying a similarity algorithm to the voiceprint for each data chunk.

Furthermore, in accordance with some embodiments of the present invention, verifying that the voiceprint for the assessed data chunk has speech belonging to the speaker to be authenticated may include assessing that the first similarity score is greater than the second similarity score.

Furthermore, in accordance with some embodiments of the present invention, the voiceprint my include an i-vector.

Furthermore, in accordance with some embodiments of the present invention, generating the i-vector for each data chunk in said plurality of data chunks may include dividing each data chunk into frames, extracting Mel-Frequency Cepstrum (MFCC) features for each of the frames, and extracting the i-vector for each data chunk from the MFCC features for each frame using a universal background model (UBM) and a total variability matrix (TVM).

Furthermore, in accordance with some embodiments of the present invention, comparing the accumulated voiceprint to the representative voiceprint of the speaker to be authenticated may include computing a similarity score for the accumulated voiceprint using the representative voiceprint of the speaker to be authenticated.

Furthermore, in accordance with some embodiments of the present invention, the method may include authenticating the speaker speaking with the second speaker over the audio channel by assessing that the computed similarity score for the accumulated voiceprint is greater than a predefined threshold.

Furthermore, in accordance with some embodiments of the present invention, the method may include detecting if the speech in the audio stream data belongs to an additional speaker on the audio channel by verifying that the speech in the voiceprints of successive data chunks in a second predefined time interval does not belong to the speaker to be authenticated or to the second speaker.

Furthermore, in accordance with some embodiments of the present invention, detecting the additional speaker on the audio channel may include computing, for each of the voiceprints of the successive data chunks, similarity scores for both the speaker to be authenticated and the second speaker and assessing that both similarity scores for each of the voiceprints of the successive data chunks are less than a preset similarity score threshold.

Furthermore, in accordance with some embodiments of the present invention, the method may include generating a representative voiceprint of the additional speaker by merging the voiceprints of the successive data chunks with the speech of the detected additional speaker.

There is further provided, in accordance with some embodiments of the present invention, a computerized system for separating and authenticating speech of a speaker on an audio stream of speakers over an audio channel, the computerized system may include a memory and a processor. The processor may be configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment the clock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel.

Furthermore, in accordance with some embodiments of the present invention, the processor may be configured to successively assess the voiceprint for each data chunk by computing for the voiceprint of each data chunk, a first similarity score for the speaker to be authenticated and a second similarity score for the second speaker.

Furthermore, in accordance with some embodiments of the present invention, the processor may be configured to successively assess the voiceprint for each data chunk by applying a similarity algorithm to the voiceprint for each data chunk.

Furthermore, in accordance with some embodiments of the present invention, the processor may be configured to verify that the voiceprint for the assessed data chunk has speech belonging to the speaker to be authenticated by assessing that the first similarity score is greater than the second similarity score.

Furthermore, in accordance with some embodiments of the present invention, the processor may be configured to generate the i-vector for each data chunk in said plurality of data chunks by dividing each data chunk into frames, extracting Mel-Frequency Cepstrum (MFCC) features for each of the frames, and extracting the i-vector for each data chunk from the MFCC features for each frame using a universal background model (UBM) and a total variability matrix (TVM).

Furthermore, in accordance with some embodiments of the present invention, the processor may be configured to compare the accumulated voiceprint to the representative voiceprint of the speaker to be authenticated by computing a similarity score for the accumulated voiceprint using the representative voiceprint of the speaker to be authenticated.

Furthermore, in accordance with some embodiments of the present invention, the processor may be configured to authenticate the speaker speaking with the second speaker over the audio channel by assessing that the computed similarity score for the accumulated voiceprint is greater than a predefined threshold.

Furthermore, in accordance with some embodiments of the present invention, the processor may be configured to detect if the speech in the audio stream data belongs to an additional speaker on the audio channel by verifying that the speech in the voiceprints of successive data chunks in a second predefined time interval does not belong to the speaker to be authenticated or to the second speaker.

Furthermore, in accordance with some embodiments of the present invention, the processor may be configured to detect the additional speaker on the audio channel by computing, for each of the voiceprints of the successive data chunks, similarity scores for both the speaker to be authenticated and the second speaker and assessing that both similarity scores for each of the voiceprints of the successive data chunks are less than a preset similarity score threshold.

Furthermore, in accordance with some embodiments of the present invention, the processor may be configured to generate a representative voiceprint of the additional speaker by merging the voiceprints of the successive data chunks with the speech of the detected additional speaker.

There is further provided, in accordance with some embodiments of the present invention, a method for generating a representative voiceprint of a speaker from audio stream data with speech over an audio channel may include in a processor, receiving audio stream data of an audio stream with speech from a first speaker and a second speaker speaking over an audio channel and a reference voiceprint of the first speaker. The audio stream data may be divided by the processor into a plurality of data chunks having a predefined time interval. Data chunks from the plurality of data chunks may be distinguished by the processor with speech from the first speaker or the second speaker in the predefined time interval. A voiceprint may be generated by the processor for the speech in each speech data chunk. A similarity score may be assigned by the processor to the voiceprint generated for each speech data chunk by applying a similarity algorithm that compares each generated voiceprint to the reference voiceprint of the first speaker, wherein the similarity score is indicative of the speech in the voiceprint of the speech data chunk belonging to the first speaker. Upon detecting that the audio stream ended, the speech data chunks with voiceprints having respective similarity scores lower than a predefined threshold may be identified by the processor. A representative voiceprint of the second speaker may be generated by the processor using voiceprints of the identified speech data chunks.

Furthermore, in accordance with some embodiments of the present invention, the method may include storing the representative voiceprint of the second speaker in a database with representative voiceprints of multiple speakers.

Furthermore, in accordance with some embodiments of the present invention, identifying the speech data chunks from the plurality of data chunks may include applying a voice activity detection algorithm to the plurality of data chunks.

Furthermore, in accordance with some embodiments of the present invention, the voiceprint may include an i-vector.

Furthermore, in accordance with some embodiments of the present invention, the similarity algorithm may use a log likelihood ratio.

Furthermore, in accordance with some embodiments of the present invention, the method may include calculating the predefined threshold from a decision boundary of a distribution of the similarity scores for voiceprints generated from the speech data chunks.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
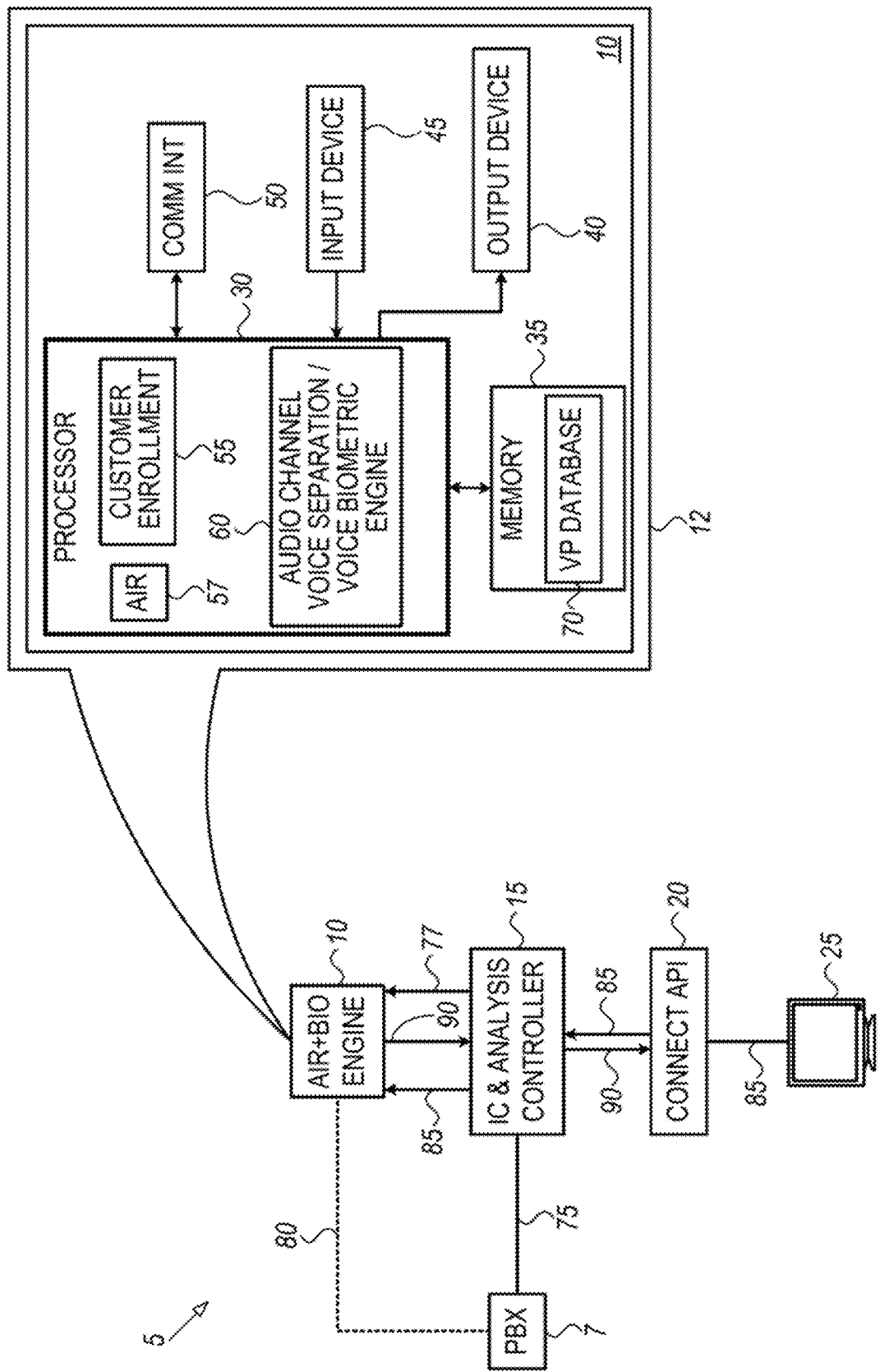
FIG. 1 schematically illustrates a system for separating and authenticating speech of a speaker on an audio stream of speakers over an audio channel, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Embodiments of the present invention herein describe a method and system for separating and authenticating speech of a speaker on an audio stream of speakers over an audio channel. A computerized system (e.g., a processor of a server, for example) may be configured to receive audio stream data of an audio stream with speech of at least two speakers on an audio channel. The call may be a monophonic audio stream, for example. In some embodiments, the at least two speakers may include a call between a customer and a customer service agent at a call center of a company, for example. The processor may receive representative voiceprints of the at least two speakers.

In some embodiments, the processor may then divide the audio stream data into data chunks. In the context herein, data chunks may also be referred to as data segments. The processor may be configured to separate each of the divided data chunks as having captured the speech or voice belonging to each of the at least two speakers. In this manner, the processor may group the data chunks where each group of data chunks belongs respectively to each of the at least two speakers in the audio stream data, and an additional group may include data chunks where the processor was not able to distinguish the speaker in the speech captured in the data chunk of the audio stream data.

After separation and grouping the data chunks according to the distinguished speaker, the processor may use the representative voiceprint to authenticate whether the speech in the data chunks in the group belongs to the distinguished speaker (e.g., the speaker to be authenticated). In some embodiments, the process of separating and/or authenticating a speaker on a call with at least two speakers (e.g., a customer and a customer service agent of the call center) may include first enrolling a customer by capturing the customer's voice in a call center, for example, and generating an accumulated or representative voiceprint for use in later calls to the call center. A call center may maintain a database of voiceprints of the call center representatives, enrolled customers and/or any other suitable persons.

During customer enrollment, it may be assumed that the agent enrollment has already been performed and a representative voiceprint of the agent may be available for use in separating the speakers in the audio stream data. Suppose there are N calls that share the same agent but different customers. These calls may be used to further refine the representative voiceprint of the agent. However, there are $2^N$ agent-customer combinations all of them cannot be analyzed in reasonable time frame.

In some embodiments, it was determined empirically that voiceprints with the voice of the call agent even including the voice of any arbitrary customer over some data chunks may be averaged so as to remove or cancel out the contributions of an arbitrary customer that may happened to be present in the voiceprint of a particular call with the agent. Averaging these voiceprints over a certain number of calls may result in a reliable voiceprint of the agent which was generated without any need for other biometric techniques such as diarization, for example.

The embodiments taught herein solve the technical problem for separating speakers on a given audio stream with high accuracy and efficiency without the use of diarization techniques which is unstable. The methods taught herein may perform voice biometrics authentication on monophonic audio streams, having multiple speakers and may identify a speaker change in an ongoing call, that alerts the customer service agent and provides guidance—for instance, for reading a legal statement to the new person, as part of regulation enforcement. The methods taught herein may also be applied to customer calls on stereo audio streams, where each caller is on a separate audio stream.

The embodiments taught herein relating to calls to a customer call center with interactions between a customer and a call center representative or agent (e.g., two speakers) is merely shown by way of example and technical clarity, and not by way of limitation of the embodiments of the present invention. The embodiments herein for separating the speakers from audio stream data may be applied to at least two speakers and may accommodate more than two speakers. Furthermore, the embodiments herein are not limited to a call center, but may be applied to any suitable platform managing audio stream data of speech or voices of multiple speakers over an audio channel, (e.g., any voice-based analytics solution which separate speakers for further analysis).

FIG. 1 schematically illustrates a system 5 for separating and authenticating speech of a speaker on an audio stream of speakers over an audio channel, in accordance with some embodiments of the present invention. System 5 may include a private branch exchange (PBX) 7, an Advanced Interaction Recorder (AIR) and voice biometric (BIO) engine server 10, an Interaction Center (IC) and Analysis controller 15, an API connect gateway 20, and a Customer-Relationship Management (CRM) client 25 or call center agent station.

In an enlargement 12, AIR and BIO server 10 may include a processor 30, a memory 35, an output device 40, an input device 45 and communication circuitry and interface module (COMM INT) 50 for wired and/or wireless communication with any other computerized device over a communication network. Furthermore, although not shown, controller 15, gateway 20 and client 25 may each include a processor, memory, input and output devices and communication circuitry configured for wired and/or wireless communication with other computerized devices over a communication network similarly as shown in enlargement 12.

Processor 30 may be configured to execute software modules stored in memory 35 including a customer enrollment module 55, an Advanced Interaction Recorder (AIR) module 57, and/or an audio channel separation-voice biometric engine module (VBE) 60. Although these software modules are shown in server 10, they may be separately executed or executed together on any suitable computerized device in system 5.

Processor 30 may include one or more processing units, e.g. of one or more computers. Processor 30 may be configured to operate in accordance with programmed instructions stored in memory 35. Processor 30 may be capable of executing an application for separating and authenticating speech of a speaker on an audio stream of speakers over an audio channel.

Processor 30 may communicate with output device 40. For example, output device 40 may include a computer monitor or screen. Processor 30 may communicate with a screen of output device 40. In another example, output device 40 may include a printer, display panel, speaker, or another device capable of producing visible, audible, or tactile output.

Processor 30 may communicate with input device 45. For example, input device 45 may include one or more of a keyboard, keypad, or pointing device for enabling a user to inputting data or instructions for operation of processor 30.

Processor 30 may communicate with memory 35. Memory 35 may include one or more volatile or nonvolatile memory devices. Memory 35 may be utilized to store, for example, programmed instructions for operation of processor 30, data or parameters for use by processor 30 during operation, or results of operation of processor 30. Memory 35 may store representative voiceprints (VP) in a VP database 70, for example.

In operation, processor 30 may execute a method for separating and authenticating speech of a speaker on an audio stream of speakers over an audio channel.

In some embodiments of the present invention, when a new customer call is initiated, a computer telephony integration (CTI) event 75 may be relayed to IC and Analysis controller 15. In response, controller 15 may send a start buffering command 77 to AIR 57. AIR 57 may start to acquire real time transport protocol (RTP) audio stream data (e.g., the audio channel) from PBX 7. AIR 57 may buffer the RTP audio stream data internally. Processor 30 may process the audio stream data in real time using VBE 60, so as to separate the audio stream data into different groups, each group of data chunks having speech for each of the respective different speakers in the audio stream data.

CRM client 25 or the agent station may send a voice biometric authentication request 85 to API connect gateway 20, which may be further relayed to IC/Analysis controller 15 and to VBE 60 in server 10.

In response, VBE 60 may use the separated audio stream data chunks in the different groups of data chunks to compare speech from a speaker against a representative voiceprint of the speaker so as to authenticate the voice of the speaker (e.g., matching of the speaker's voice with the enrolled representative voiceprint of the speaker) captured in the separated audio stream data chunks. Authentication results 90 may be relayed to CRM client 25.

In the embodiments of the present invention, voice biometrics may be used in the analysis of the speech captured in the audio stream data. All segments or data chunks of the audio stream data may be represented by intermediate vectors or identity vectors, otherwise known as i-vectors. In some embodiments, each i-vector may be an array, for example, including 400 numbers, each number representing a characteristic of the speech of a speaker. System 5 may verify a given i-vector against a pre-known i-vector of the speakers, customer and agent also known herein as a representative voiceprint. The embodiments herein may be applied in real-time and with high reliability. The embodiments herein may use small data segments of the speech of a speaker captured in the audio stream data to create i-vectors for comparison against pre-known enrolled i-vectors (e.g., a representative voiceprint of a speaker).

Figure 2:
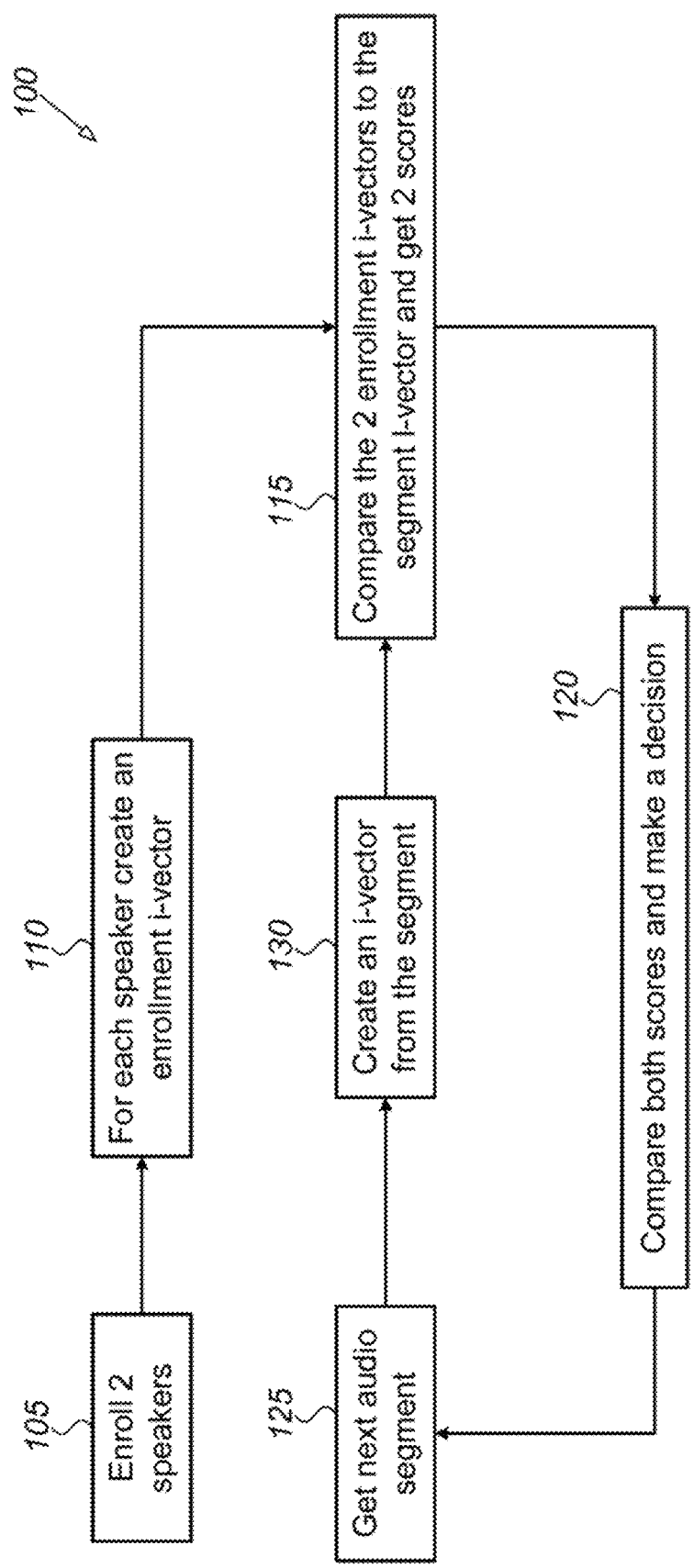
FIG. 2 schematically illustrates a flow diagram of a process for speaker separation using i-vectors, in accordance with some embodiments of the present invention.

FIG. 2 schematically illustrates a flow diagram 100 of a process for speaker separation using i-vectors, in accordance with some embodiments of the present invention. The steps described herein below may be performed by processor 30. In a step 105, two speakers may be enrolled in system 5 for voice authentication using representative voiceprints. The enrollment process may be used to generate the representative voiceprints. In a step 110, an i-vector may be generated for each speaker from the audio stream data.

In a step 125, processor 30 may obtain a next segment from the audio stream data (e.g., get next audio segment), the next segment being the first segment if processor 30 is sampling the beginning of the audio stream data in a first iteration. The audio stream data generated from the signal on the audio channel including the speech of the two speakers may be partitioned into a plurality of audio stream data segments. Each audio stream data segment may be successively analyzed to assess whether the speech captured in each audio stream data segment belongs to which of the two speakers by the following flow: In a step 130, processor 30 may create an i-vector from the audio stream data segment. In a first comparison step 115, processor 30 may compare the two enrollment i-vectors of the two speakers (e.g., the two representative voiceprints for the first speaker and the second speaker) with the i-vector from the audio stream data segment to get two scores, a first score related to the possibility that the speech in the segment is from the first speaker and the second score for the second speaker.

In a second comparison step 120, processor 30 may then decide based on the first and the second score whether the voice or speech captured in the audio stream data segment belongs to the first or the second speaker. Processor 30 may then fetch the next audio stream data segment from the audio stream data. This process may continue iteratively until the end of the audio stream data, e.g., the end of the call, or after a predefined time from the beginning of the call, in order to sample the speakers speaking on the customer call.

Figure 3:
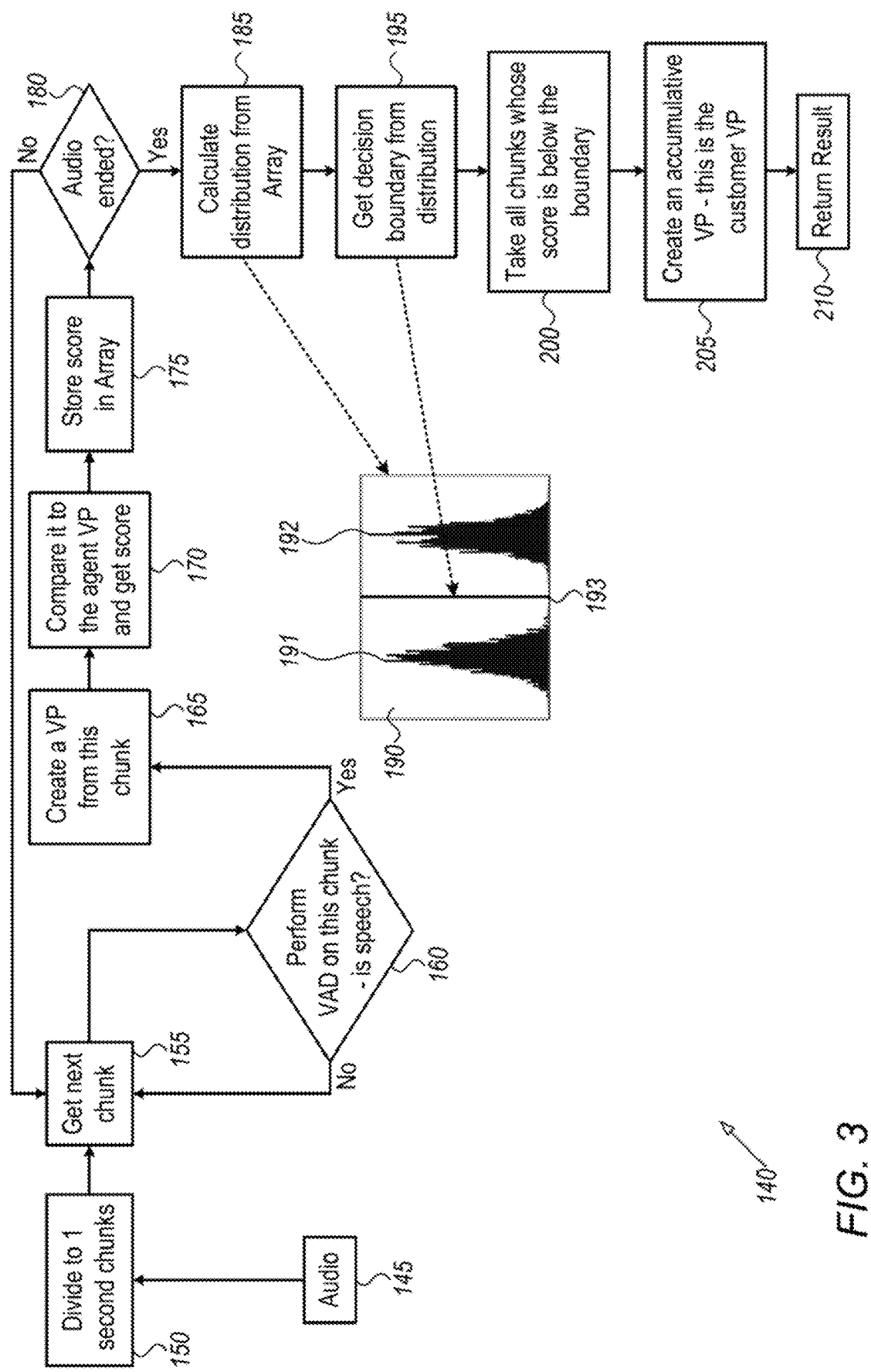
FIG. 3 is a flowchart depicting a method for voice separation of speakers in an audio channel and generation of a representative voiceprint of the speakers, in accordance with some embodiments of the present invention.

FIG. 3 is a flowchart 140 depicting a method for voice separation of speakers in an audio channel and generation of a representative voiceprint of the speakers, in accordance with some embodiments of the present invention. The generation of a representative voiceprint of a speaker, typically a customer of a company, calling into a call center, for example, may also be known herein as customer enrollment. Once the customer enrolls a representative voiceprint, system 5 (e.g., processor 30) may use the representative voiceprint for authenticating the voice of the speaker in subsequent calls to the call center. The representative voiceprint of the call center agent may be performed at any time.

The flow for enrolling a first speaker for generating a representative voiceprint during a call with a second speaker such as, for example, where the first speaker is a customer calling into the call center and the second speaker is a call center agent with a pre-enrolled representative voiceprint is as follows: In a step 145, processor 30 may receive audio stream data of a call between the customer and the call center agent taking place over an audio channel. In some embodiments, the audio channel may be a monophonic (mono) audio channel. In a step 150, processor 30 may divide the audio stream data into audio stream data chunks (e.g., segments) with a predefined time interval, such as 1 second data chunks, for example.

In a step 155, starting from the beginning of the audio stream data, processor 30 fetches the next chunk in the audio stream data, the next chunk being the first chunk if processor 30 is sampling the audio stream data in a first iteration.

In a decision step 160, processor 30 may perform a voice activity detection (VAD) on the data chunk from step 155 to assess whether there is speech captured in the data chunk. VAD may be a state machine based on energy levels. VAD (Voice Activity detection) may be used for detecting speech versus silence in the audio stream data chunk. The steps used in VAD may include a noise reduction stage, e.g. via spectral subtraction. Some features or parameters may then be calculated from a section (e.g., data chunk) of the input signal. A classification rule may be applied to classify the data chunk as having speech or no speech. The classification rule may identify speech when a VAD parameter exceeds a threshold.

If there is no speech detected by VAD, processor 30 may discard the data chunk and fetch the next data chunk in step 155. If there is speech detected in the data chunk, processor 30 creates a voiceprint from the data chunk in a step 165. In some embodiments, the voiceprint may be an i-vector.

Processor 30 may then compare the created voiceprint of the data chunk to the representative voiceprint of the call center agent in a step 170 and assign a similarity score as to how close the voiceprint of the data chunk matches the voiceprint of the call center agent. The similarity score may be of any suitable definition or equation for assessing a match by comparing the similarity score to a predefined threshold score. In a step 175, the similarity scores and the generated voiceprint with detected speech may be stored. The similarity scores for each data chunk may be indexed and/or stored in an array. In some embodiments, the similarity score may be determined using a Log Likelihood Ratio in the similarity measurement of step 170.

In a decision step 180, processor 30 may detect if the call in the audio channel ended. If the call did not end, processor 30 may fetch the next data chunk in the audio stream data in step 155. If the call ended, processor 30 in a step 185 may calculate a distribution 190 of the array of similarity scores for all of the data chunks that captured speech as detected in step 160. In some embodiments, the array may be sorted. In other embodiments, distribution 190 may include a histogram of the similarity scores.

In some embodiments of the present invention, distribution 190 of similarity scores in the array may be a bimodal histogram exhibiting two peaks 191 and 192 with similarity scores of the generated voiceprints of the customer service agent appearing in peak 192 and the similarity scores of the customer in peak 191, where a higher similarity score is indicative of speech of the call center agent. In a step 195, processor 30 may identify a decision boundary 193 between bimodal histogram peaks 191 and 192. In some embodiments, decision boundary 193 may be the center of mass of distribution 190 (e.g., the bimodal histogram in this example).

In a step 200, in order to generate a representative voiceprint of the customer, processor 30 may use (e.g., merge) the voiceprints of all the accumulated data chunks below decision boundary 193 associated with histogram peak 191 identified as having captured the voice of the customer so as to create an accumulative voiceprint of the customer in a step 205. In a step 210, processor 30 may return the result of the generated representative voiceprint of the customer to be stored, for example, in voiceprint (VP) database 70 in memory 35 for use in authenticating the customer in future calls to the call center.

Figure 4:
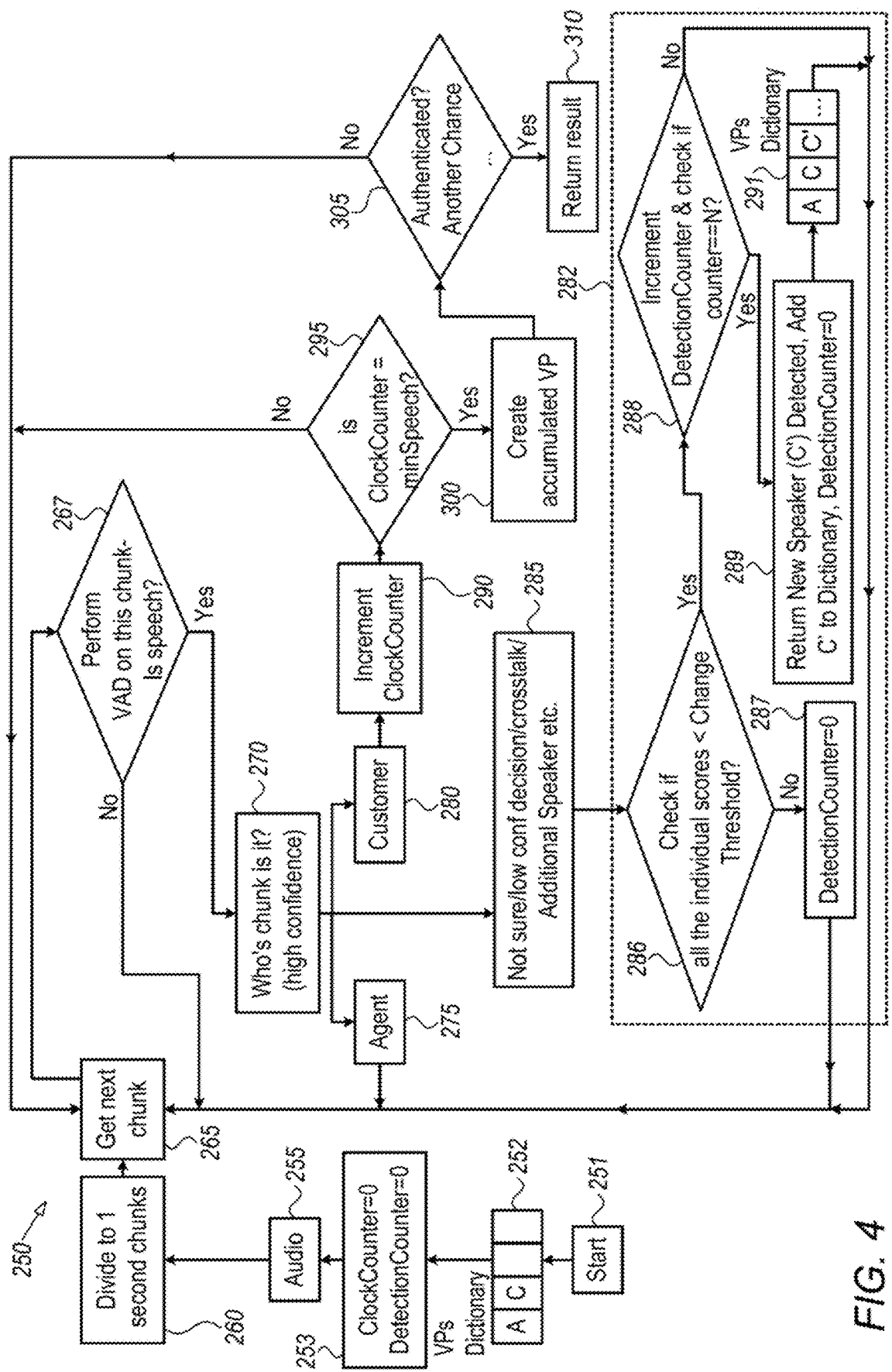
FIG. 4 is a flow diagram depicting a method for separating and authenticating speech of a speaker on an audio stream of speakers over an audio channel, in accordance with some embodiments of the present invention.

FIG. 4 is a flow diagram 250 depicting a method for separating and authenticating speech of a speaker on an audio stream of speakers over an audio channel, in accordance with some embodiments of the present invention. Once the customer and the call agent are biometrically enrolled, the representative voiceprints may then be used by system 5 in subsequent calls between the customer and the call center to separate the voice of the customer and the call center agent in the audio stream data and authenticate the customer's voice in the call. In a starting step 251, processor 30 may receive representative voiceprints of the speaker to be authenticated, such as a customer denoted C, and the second speaker, such as the call center agent denoted A. The representative voiceprints may be retrieved and/or fetched from database 70 to a voiceprint dictionary 252 for real time use in the customer call. In an initialization step 253, a detection counter (e.g., DetectionCounter=0) and a clock counter (e.g., ClockCounter=0) may be reset to zero.

In a step 255, processor 30 may receive audio stream data of a call between the customer and the call center agent taking place over an audio channel. In some embodiments, the audio channel may be a monophonic (mono) audio channel. In a step 260, processor 30 may divide the audio stream data into audio stream data chunks (e.g., segments) with a predefined time interval, such as 1 second data chunks, for example.

In a step 265, starting from the beginning of the audio stream data, processor 30 fetches the next chunk in the audio stream data, the next chunk being the first chunk if processor 30 is sampling the beginning of the audio stream data in a first iteration.

In a step 267, processor 30 may perform a voice activity detection (VAD) on the data chunk from step 265 to assess whether there is speech captured in the data chunk. If there is no speech in the data chunk, processor 30 may discard the assessed data chunk with no speech and fetch the next data chunk in step 265.

If there is speech detected in a decision step 270, using the representative voiceprints of the customer and the call center agent, processor 30 may initially assess whether the data chunk has speech belonging to call center agent 275, speech belonging to customer 280, or processor 30 may not be able to assess in a step 285 whether the speech belongs to either the agent or the customer either due to low confidence in the decision algorithm or crosstalk. In some embodiments, a new speaker may have joined the call over the audio channel and processor 30 may execute another flow 282 for detecting and/or identifying an additional speaker joining the call as shown in FIG. 4, but flow 282 will be discussed after FIG. 5. If the speech not initially assessed as belonging to the customer, processor 30 discards the data chunk and fetches the next data chunk in step 265. If the speech in the data chunk is initially assessed as belonging to the customer, processor 30 may increment a clock counter (e.g., Clock-Counter) in a step 290 by the predefined time period of the data chunk, such as one second in the example shown in FIG. 4.

In some embodiments of the present invention, processor 30 initially assesses the identity of the speaker. The predefined time intervals of the data chunks may be too short to be able to reliably authenticate the voiceprint of the speaker. However, processor 30 may need a voiceprint sample with a time duration long enough for reliable authentication by using multiple voiceprints created from data chunks assessed or suspected of being that of the customer. Stated differently, the voiceprint sample may need to have a time duration greater than a predefined speech duration (e.g., minSpeech), so as to reliably authenticate the voiceprint sample as belonging to the customer.

In a decision step 295, processor 30 assesses if the clock counter has a value greater than a predefined speech duration (e.g., minSpeech). If not, processor 30 continues to fetch the next data chunk in step 265. If so, in a step 300, processor 30 creates an accumulated voiceprint (VP) of the data chunks having speech assessed as belonging to customer as in step 280. In some embodiments, the accumulated voiceprint (VP) may include processor 30 merging all the voiceprints generated from the data chunks having speech assessed as belonging to customer to form the accumulated voiceprint. In a final authentication step 305, processor 30 may compare the accumulated voiceprint to the representative voiceprint of the customer. In a step 310, processor 30 may report the authentication results if the voice or speech of the customer in the call with the call center agent matches or mismatches the representative voiceprint of the customer when the customer enrolled.

Figure 5:
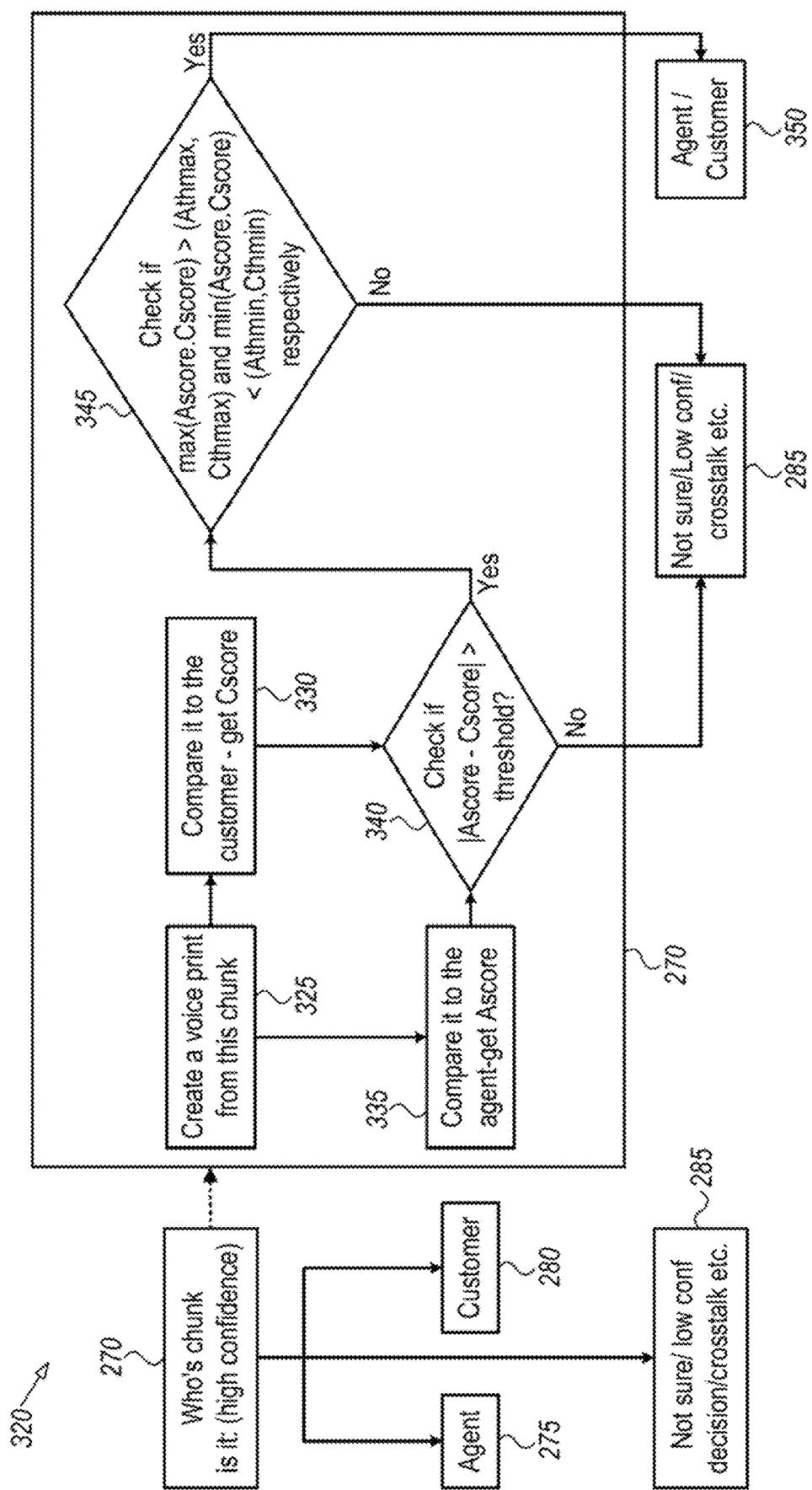
FIG. 5 is a flow diagram depicting an audio stream data chunk decision assignment flow, in accordance with some embodiments of the present invention, FIG. 6 schematically illustrates graph of similarity scores of two speakers versus time with corresponding spectrograms, in accordance with some embodiments of the present invention.

FIG. 5 is a flow diagram 320 depicting an audio stream data chunk decision assignment flow, in accordance with some embodiments of the present invention. Decision step 270 may include the following deterministic algorithm for assessing whether the speech captured in a voiceprint of the audio data chunk belongs to the call agent or the customer as follows: Processor 30 may create a voiceprint of the fetched data chunk in a step 325.

In a step 330, processor 30 may compare the voiceprint of the data chunk to the representative voiceprint of the customer and compute a customer similarity score $C_{score}$. In a step 335, processor 30 may compare the voiceprint of the data chunk to the representative voiceprint of the call agent and compute an agent similarity score $A_{score}$. In some embodiments, the similarity scores may use a Log Likelihood Ratio in steps 330 and 335.

In a first decision step 340, processor 30 may assess whether $|A_{score} - C_{score}| >$ threshold value. This step measures if there is any dominant detection of the customer or the call agent in the voiceprint generated from the data chunk. If not in a step 285, processor 30 reports that there is no assessment as whether the speech of the speaker captured in the voiceprint generated from the data chunk belongs to either the call agent or the customer. The result may be considered irrelevant, the data chunk is discarded and the next chunk fetched in step 265.

If there is dominant detection of the customer or the call agent in the voiceprint generated from the data chunk, in a second decision step 345, processor 30 may assess whether $\max(A_{score}, C_{score}) > (A_{thmax}, C_{thmax})$ and $\min(A_{score}, C_{score}) < (A_{thmin}, C_{thmin})$ respectively. If so, in a step 350, processor 30 reports that the speech of the speaker captured in the voiceprint generated from the data chunk belongs to the call agent or the customer. If not in a step 285, processor 30 reports that there is no reliable assessment as whether the speech of the speaker captured in the voiceprint generated from the data chunk belongs to either the call agent or the customer. The result is considered irrelevant, and data chunk is discarded and the next chunk fetched in step 265. This logical test may utilize four additional thresholds related to the agent and customer that may be tuned: $A_{thmax}$, $A_{thmin}$, $C_{thmax}$, $C_{thmin}$.

i-vectors are an update, or enhancement in speaker verification technology to Joint Factor Analysis (JFA). JFA divides a human voice into two factors: a speaker factor and a channel factor, which produces several parametric components as follows: Speaker independent component (m), Speaker dependent component (Vy), Channel dependent component (Ux), and Speaker dependent residual component (Dz). The speaker s may be represented by:

$$s = m + Ux + Vy + Dz \quad (1)$$

where the U,V,D are matrices may be determined from a large labelled database corpus. x,y,z are vectors that may be obtained by U,V and D matrices and a given call session. m may be computed from a universal background model (UBM), which is a model representing speech in general, and may include both the channel and speaker effects. M may also be obtained from a large database corpus, not necessarily labelled.

The channel dependent component Ux may include speaker characteristics, and therefore is not strongly channel dependent. Thus, using this component is not optimal and for use in the embodiments taught herein, Equation (1) may be modified in a more compact, simplistic, and more accurate representation as given by Equation (2):

$$s = m + Tw \quad (2)$$

where T is referred to as the "total variability matrix", and w is the i-vector for speaker s.

T may be obtained in a similar manner that JFA may obtain matrix V. However, all audio stream data from calls used in this calculation are assumed to be made from different people, so as to generate the largest variability in the call samples. Matrix T may include a speaker effect and a channel effect, which are also accounted for in the i-vectors themselves. Therefore, there may be a need to later normalize the channel effect in the algorithm. Thus, upon obtaining all the variables in the algorithm except w, an i-vector extractor. Thus, creating or generating the voiceprints from the data chunks may also be alternatively referred to herein as extracting i-vectors. These i-vectors may be later compared in various ways. An approach to normalize the "different channels effect" may include a probabilistic linear discriminant analysis (PLDA) followed by a scoring step called "Likelihood".

In some embodiments of the present invention. FIG. 4 describes an additional flow 282 for detecting when and/or identifying an additional speaker that joined a customer call with the agent and the customer. With the agent (A) and the customer (C) previously enrolled, their representative voiceprints may be stored in VP database 70 and available in VP dictionary 252 for the customer call in the monophonic audio stream, for example.

In some embodiments of the present invention, when an additional (third) speaker in this example, joins the conversation with no previous enrollment and/or no prior identifying information, processor 30 may be configured to detect the additional speaker in real time. The detection of the additional speaker may be based on decision step 345 returning a decision in step 285 where processor 30 may not be sure if the speech of the voiceprint of the current data chunk belongs to the agent or the customer in step 285 so as to trigger flow 282 to determine whether a new speaker joined the call.

Flow 282 may include a decision step 286, where processor 30 may assess if the conditions hold where the similarity scores |Ascore|<ChangeThreshold and |Cscore|<ChangeThreshold. ChangeThreshold is a preset similarity score threshold. If this condition in step 286 does not hold, processor 30 may reset Detection Counter in a step 287 and processor 30 may get the next data chunk in step 265.

If the condition in step 286 does hold, processor 30 may increment the detection counter by a predefined time interval (e.g., of the data chunk), such as 1 second, for example, in a step 288 and may check if DetectionCounter==N, where N is a constant based on the predefined time interval such as a few seconds (e.g., 2-5 seconds) for a real time response. Stated differently, processor 30 assessing that the agent and customer similarity scores are less than the preset ChangeThreshold successively for a predefined number of data chunks over a time interval N (e.g., a second predefined time interval for detecting the additional speaker), may be indicative that a new additional speaker C' joined the conversation. In step 288, if DetectionCounter<N, processor 30 may get the next data chunk in step 265.

If DetectionCounter==N in step 288, processor 30 may alert the agent that a new additional speaker C' is detected in the audio channel in a step 289. Processor 30 may merge the voiceprints of data chunks taken in the audio stream data in the time interval N identified with the speech of new speaker C' to generate a representative voiceprint of C'. Processor 30 may update the voiceprint dictionary 291 with the voiceprint of C' and/or may update VP database 70 in step 289 for continued use in the conversation. Processor 30 may reset the detection counter in step 289 (e.g., DetectionCounter=0).

In some embodiments of the present invention, processor 30 may use additional speaker detection flow 282 to detect additional speakers C", C"' and so forth on the call and to acquire their voiceprints. Moreover, the detection of new speaker C' and/or generation of the representative voiceprint of C' may be performed in real time. The authentication flow (e.g., step 270 to step 310 in FIG. 4 in the call now between A, C and C' may continue using the new representative voiceprint of C' until the call is terminated.

Figure 6:
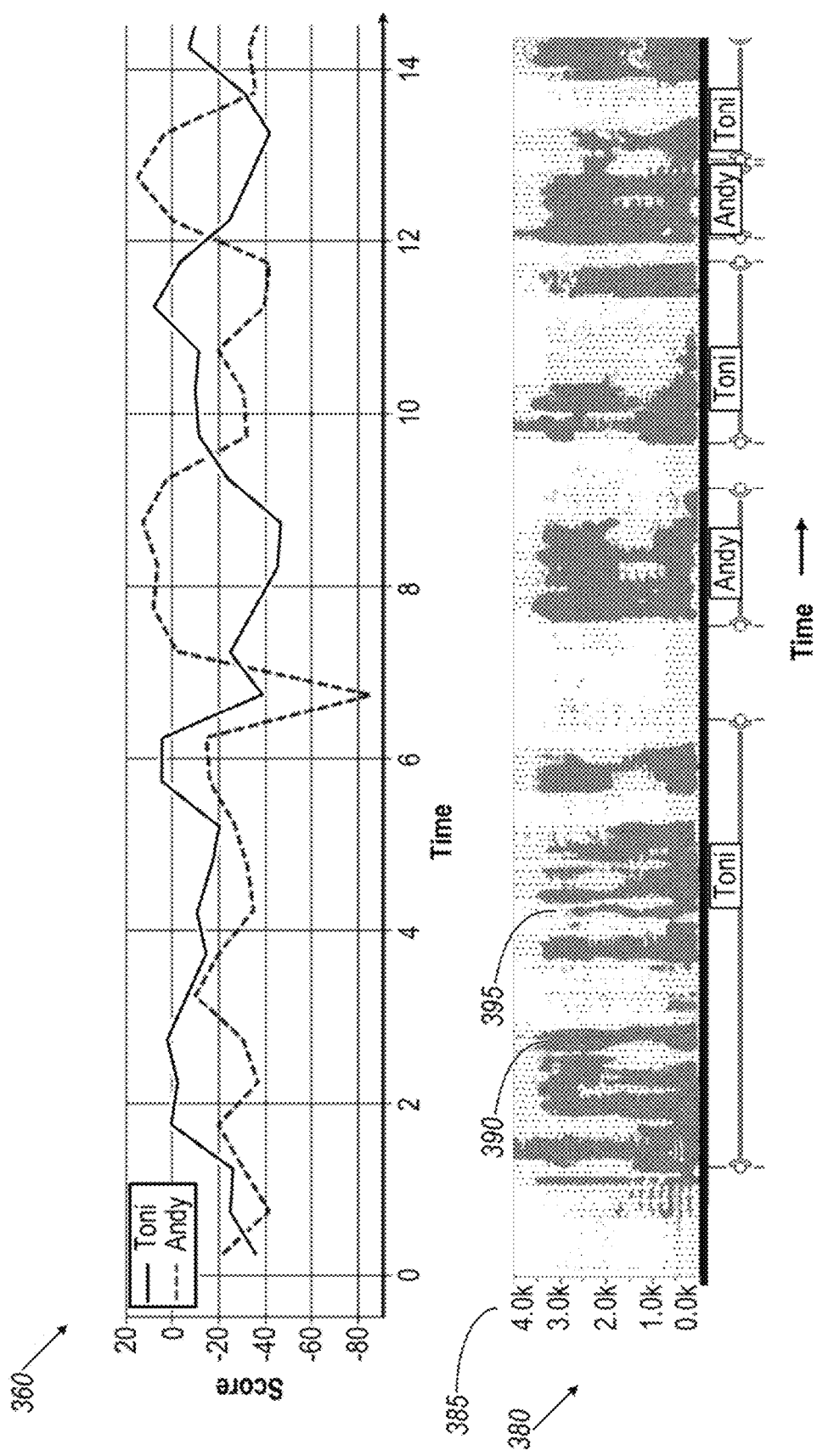

FIG. 6 schematically illustrates graph 360 of similarity scores of two speakers versus time with corresponding spectrograms 380, in accordance with some embodiments of the present invention.

As an example, the data shown in FIG. 6 was taken as a test to verify if the algorithm can work fast enough in real-time. 2400 voiceprints were extracted in 15 minutes of computation time from 10-minute long audio files, or 0.375 seconds per voiceprint file. Thus, the algorithm is significantly faster than any real-time requirements. The data shown in graph 360 of FIG. 6 was taken for speech between two different speakers. Voiceprints were generated every 0.5 seconds, and the sampling duration was 1 second. The frame width was 1 second and frame shift was 0.5 seconds.

Graph 360 shows two similarity scores as a function of time for two speakers named Toni and Andy based on comparing voiceprints (e.g., i-vectors) generated from one second audio stream data chunks to the reference voiceprints of Toni and Andy. For example, a higher similarity score of Toni relative to Andy in the voiceprint of a one second data chunk may reliably predict that voice of Toni is the captured speaker in that one second data chunk, and vice versa. The larger the difference (e.g., at 8 seconds, for example, in graph 360) between the similarity score of Toni relative to Andy in a given time interval, for example, may be indicative of the one of the speakers being the dominant voice in the given time interval. A larger difference also provides a more reliable prediction of who is speaking in the given time interval.

Spectrogram 380 may be used as another measure to reliably assess who is the speaker in a given time interval. Spectrogram 380 is a plot of the captured audio signal frequency in the given data chunk during a given time interval. The darker regions 390 are indicative of a higher amplitude of the audio signal at given audio frequency as opposed to the lighter regions 395 with a smaller amplitude. Below the spectrogram is a manual annotation of the call with time stamped labels for the different speakers: Toni or Andy. The higher similarity score curve and the difference between them may be used to separate the different speakers in each predefined time interval, in real-time, and to accurately predict who is speaking, as long as both speakers are enrolled.

Figure 7:
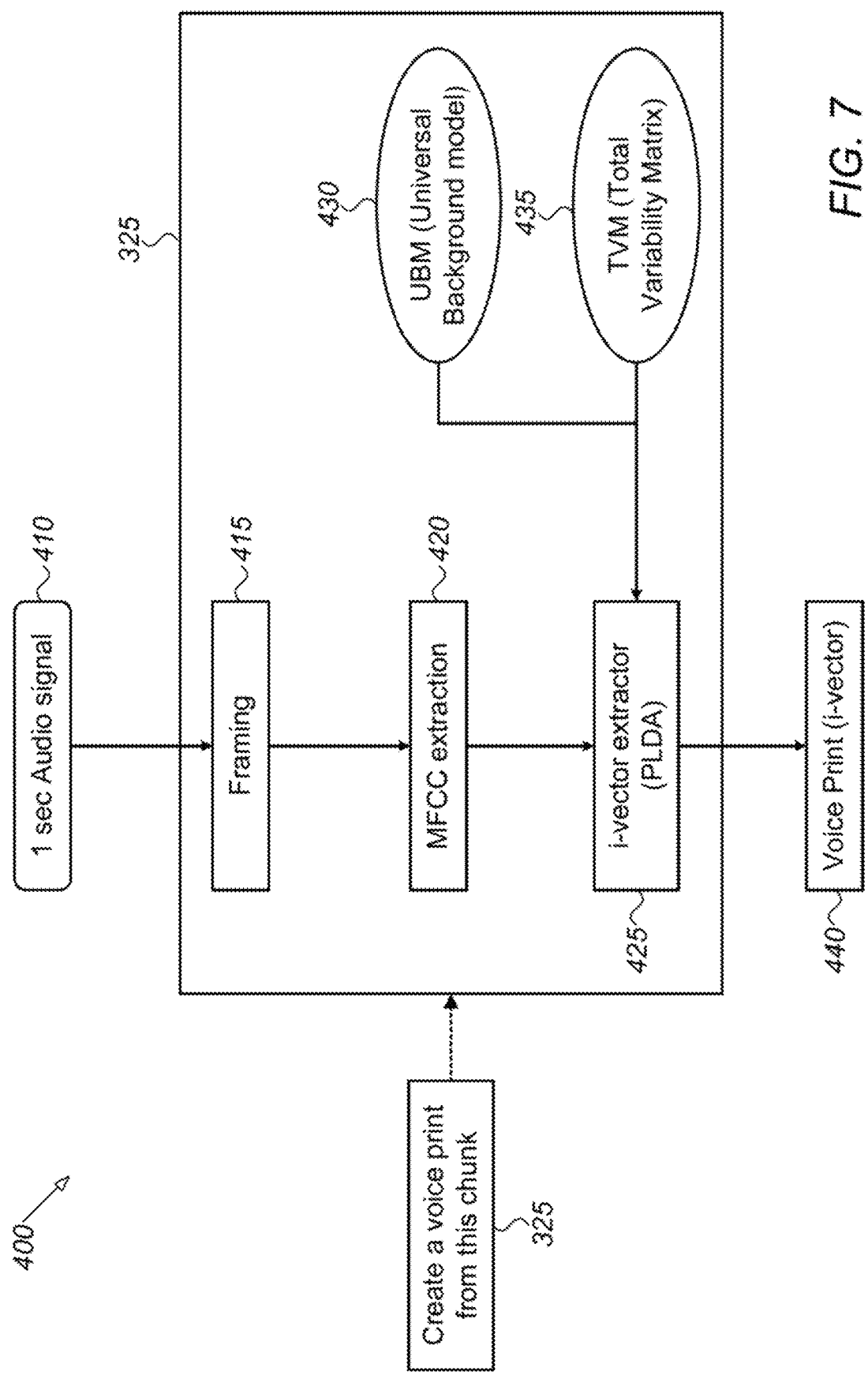
FIG. 7 is a flow diagram depicting a method for creating a voiceprint from an audio stream data chunk, in accordance with some embodiments of the present invention.

FIG. 7 is a flow diagram 400 depicting a method for creating a voiceprint 440 from an audio stream data chunk, in accordance with some embodiments of the present invention. The flow for step 325 in FIG. 5 is shown here in FIG. 7. Processor 30 fetches data chunk from the audio stream data with a predefined time interval or duration, for the example shown here, a one second data chunk. In a framing step 415, the one second data chunk may be broken or divided into 25 ms frames with 10 ms shifts, for example.

In a step 420, processor 30 may extract Mel-Frequency Cepstrum (MFCC) features from each frame. In a step 425, processor 30 may extract an i-vector from the MFCC features for each frame using a pretrained universal background model (UBM) and a Total Variability Matrix (TVM). Once the i-vector is generated for the audio stream data chunk, processor 30 may compare it to the enrolled representative voiceprint (e.g., representative i-vector) of the agent and the customer. In some embodiments, processor 30 may use a likelihood method for computing the similarity scores CScore and AScore, for the customer and agent, respectively, in steps 330 and 335 as shown in FIG. 5.

Figure 8:
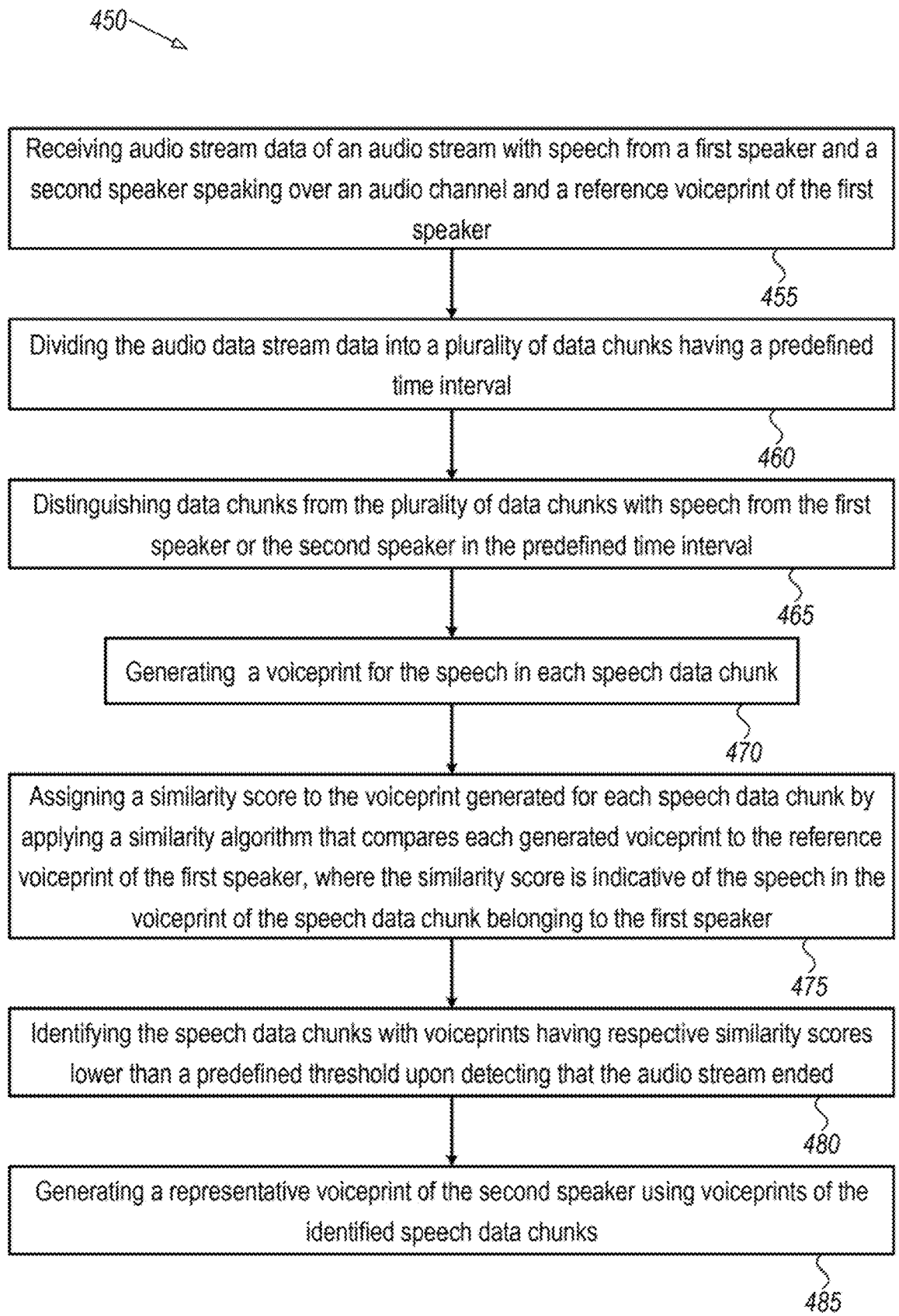
FIG. 8 is a flowchart depicting a method for generating a representative voiceprint of a speaker from audio stream data with speech over an audio channel, in accordance with some embodiments of the present invention.

FIG. 8 is a flowchart depicting a method 450 for generating a representative voiceprint of a speaker from audio stream data with speech over an audio channel, in accordance with some embodiments of the present invention. Method 450 may be executed by processor 30 of system 5.

Method 450 may include receiving 455 audio stream data of an audio stream with speech from a first speaker and a second speaker speaking over an audio channel and a reference voiceprint of the first speaker. Method 450 may include dividing 460 the audio stream data into a plurality of data chunks having a predefined time interval.

Method 450 may include distinguishing 465 data chunks from the plurality of data chunks with speech from the first speaker or the second speaker in the predefined time interval. Method 450 may include generating 470 a voiceprint for the speech in each speech data chunk.

Method 450 may include assigning 475 a similarity score to the voiceprint generated for each speech data chunk by applying a similarity algorithm that compares each generated voiceprint to the reference voiceprint of the first speaker, where the similarity score is indicative of the speech in the voiceprint of the speech data chunk belonging to the first speaker.

Method 450 may include identifying 480 the speech data chunks with voiceprints having respective similarity scores lower than a predefined threshold upon detecting that the audio stream ended. Method 450 may include generating 485 a representative voiceprint of the second speaker using voiceprints of the identified speech data chunks.

Figure 9:
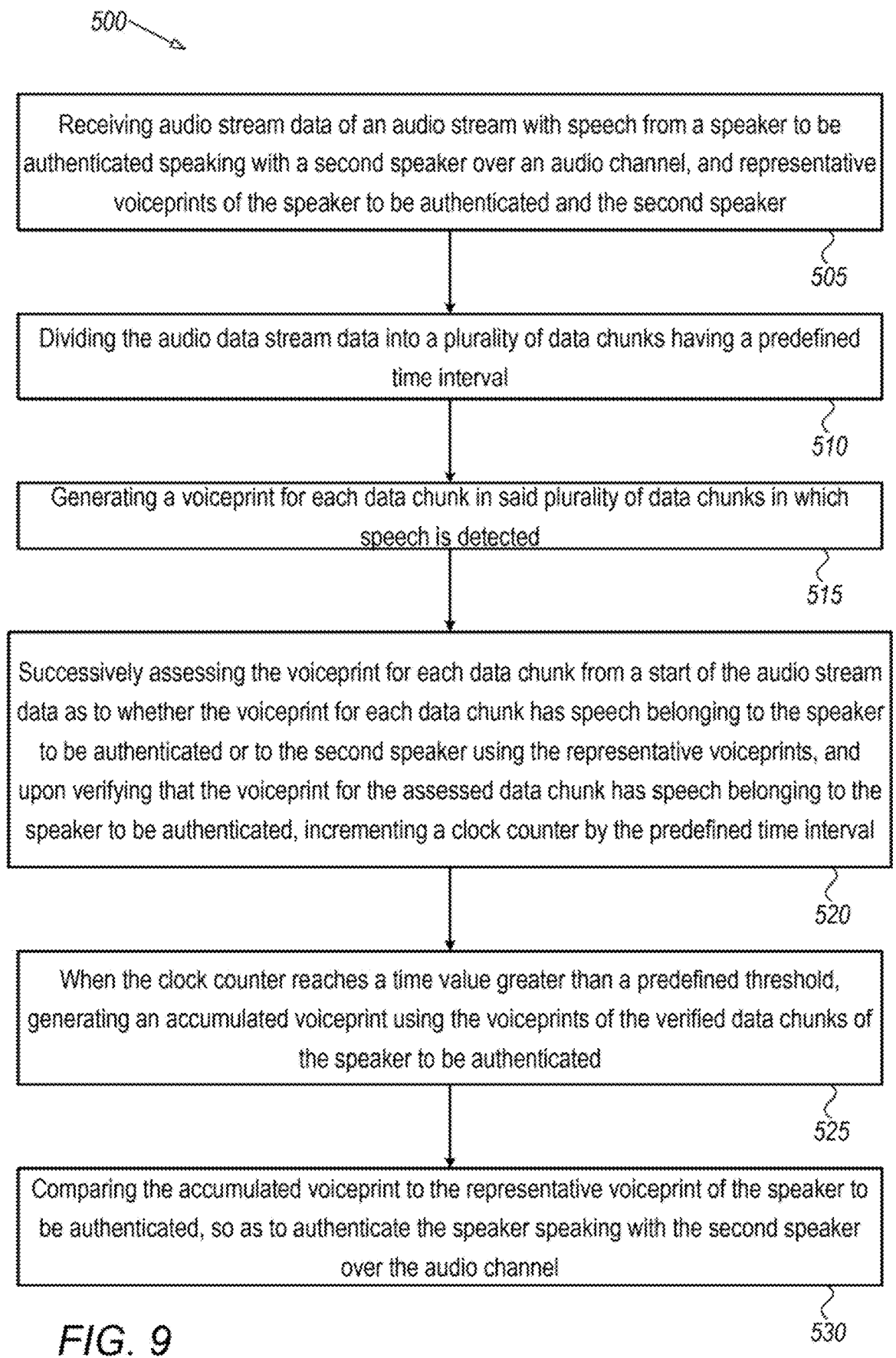
FIG. 9 is a flowchart depicting a method for separating and authenticating speech of a speaker on an audio stream of speakers over an audio channel, in accordance with some embodiments of the present invention.

FIG. 9 is a flowchart depicting a method 500 for separating and authenticating speech of a speaker on an audio stream of speakers over an audio channel, in accordance with some embodiments of the present invention.

Method 500 may include receiving 505 audio stream data of an audio stream with speech from a speaker to be authenticated speaking with a second speaker over an audio channel, and representative voiceprints of the speaker to be authenticated and the second speaker. Method 500 may include dividing 510 the audio stream data into a plurality of data chunks having a predefined time interval. Method 500 may include generating 515 a voiceprint for each data chunk in said plurality of data chunks in which speech is detected.

Method 500 may include successively assessing 520 the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, incrementing the clock counter by the predefined time interval.

Method 500 may include generating 525 an accumulated voiceprint using the verified data chunks of the speaker to be authenticated when the clock counter has a time value greater than a predefined threshold. Method 500 may include comparing 530 the accumulated voiceprint to the representative voiceprint of the speaker to be authenticated, so as to authenticate the speaker speaking with the second speaker over the audio channel In some embodiments of the present invention, a method for separating and authenticating speech of a speaker on an audio stream of speakers over an audio channel may include, in a processor, receiving audio stream data of an audio stream with speech from a speaker to be authenticated speaking with a second speaker over an audio channel, and representative voiceprints of the speaker to be authenticated and the second speaker. The audio stream data may be divided by the processor into a plurality of data chunks having a predefined time interval. A voiceprint may be generated by the processor for each data chunk in said plurality of data chunks in which speech is detected. The voiceprint for each data chunk from a start of the audio stream data may be successively assessed by the processor as to whether the voiceprint for each data chunk has speech belonging to the speaker to be authenticated or to the second speaker using the representative voiceprints, and upon verifying by the processor that the voiceprint for the assessed data chunk has speech belonging to the speaker to be authenticated, the clock counter may be incremented by the predefined time interval. When the clock counter has a time value greater than a predefined threshold, an accumulated voiceprint may be generated by the processor using the verified data chunks of the speaker to be authenticated. The accumulated voiceprint may be compared by the processor to the representative voiceprint of the speaker to be authenticated, so as to authenticate the speaker speaking with the second speaker over the audio channel.

In some embodiments of the present invention, successively assessing the voiceprint for each data chunk may include computing for the voiceprint of each data chunk, a first similarity score for the speaker to be authenticated and a second similarity score for the second speaker.

In some embodiments of the present invention, successively assessing the voiceprint for each data chunk may include applying a similarity algorithm to the voiceprint for each data chunk.

In some embodiments of the present invention, verifying that the voiceprint for the assessed data chunk has speech belonging to the speaker to be authenticated may include assessing that the first similarity score is greater than the second similarity score.

In some embodiments of the present invention, the voiceprint my include an i-vector.

In some embodiments of the present invention, generating the i-vector for each data chunk in said plurality of data chunks may include dividing each data chunk into frames, extracting Mel-Frequency Cepstrum (MFCC) features for each of the frames, and extracting the i-vector for each data chunk from the MFCC features for each frame using a universal background model (UBM) and a total variability matrix (TVM).

In some embodiments of the present invention, comparing the accumulated voiceprint to the representative voiceprint of the speaker to be authenticated may include computing a similarity score for the accumulated voiceprint using the representative voiceprint of the speaker to be authenticated.

In some embodiments of the present invention, the method may include authenticating the speaker speaking with the second speaker over the audio channel by assessing that the computed similarity score for the accumulated voiceprint is greater than a predefined threshold.

In some embodiments of the present invention, the method may include detecting if the speech in the audio stream data belongs to an additional speaker on the audio channel by verifying that the speech in the voiceprints of successive data chunks in a second predefined time interval does not belong to the speaker to be authenticated or to the second speaker.

In some embodiments of the present invention, detecting the additional speaker on the audio channel may include computing, for each of the voiceprints of the successive data chunks, similarity scores for both the speaker to be authenticated and the second speaker and assessing that both similarity scores for each of the voiceprints of the successive data chunks are less than a preset similarity score threshold.

In some embodiments of the present invention, the method may include generating a representative voiceprint of the additional speaker by merging the voiceprints of the successive data chunks with the speech of the detected additional speaker.

In some embodiments of the present invention, a computerized system for separating and authenticating speech of a speaker on an audio stream of speakers over an audio channel, the computerized system may include a memory and a processor. The processor may be configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment the clock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel.

In some embodiments of the present invention, the processor may be configured to successively assess the voiceprint for each data chunk by computing for the voiceprint of each data chunk, a first similarity score for the speaker to be authenticated and a second similarity score for the second speaker.

In some embodiments of the present invention, the processor may be configured to successively assess the voiceprint for each data chunk by applying a similarity algorithm to the voiceprint for each data chunk.

In some embodiments of the present invention, the processor may be configured to verify that the voiceprint for the assessed data chunk has speech belonging to the speaker to be authenticated by assessing that the first similarity score is greater than the second similarity score.

In some embodiments of the present invention, the voiceprint may include an i-vector.

In some embodiments of the present invention, the processor may be configured to generate the i-vector for each data chunk in said plurality of data chunks by dividing each data chunk into frames, extracting Mel-Frequency Cepstrum (MFCC) features for each of the frames, and extracting the i-vector for each data chunk from the MFCC features for each frame using a universal background model (UBM) and a total variability matrix (TVM).

In some embodiments of the present invention, the processor may be configured to compare the accumulated voiceprint to the representative voiceprint of the speaker to be authenticated by computing a similarity score for the accumulated voiceprint using the representative voiceprint of the speaker to be authenticated.

In some embodiments of the present invention, the processor may be configured to authenticate the speaker speaking with the second speaker over the audio channel by assessing that the computed similarity score for the accumulated voiceprint is greater than a predefined threshold.

In some embodiments of the present invention, the processor may be configured to detect if the speech in the audio stream data belongs to an additional speaker on the audio channel by verifying that the speech in the voiceprints of successive data chunks in a second predefined time interval does not belong to the speaker to be authenticated or to the second speaker.

In some embodiments of the present invention, the processor may be configured to detect the additional speaker on the audio channel by computing, for each of the voiceprints of the successive data chunks, similarity scores for both the speaker to be authenticated and the second speaker and assessing that both similarity scores for each of the voiceprints of the successive data chunks are less than a preset similarity score threshold.

In some embodiments of the present invention, the processor may be configured to generate a representative voiceprint of the additional speaker by merging the voiceprints of the successive data chunks with the speech of the detected additional speaker.

In some embodiments of the present invention, a method for generating a representative voiceprint of a speaker from audio stream data with speech over an audio channel may include in a processor, receiving audio stream data of an audio stream with speech from a first speaker and a second speaker speaking over an audio channel and a reference voiceprint of the first speaker. The audio stream data may be divided by the processor into a plurality of data chunks having a predefined time interval. Data chunks from the plurality of data chunks may be distinguished by the processor with speech from the first speaker or the second speaker in the predefined time interval. A voiceprint may be generated by the processor for the speech in each speech data chunk. A similarity score may be assigned by the processor to the voiceprint generated for each speech data chunk by applying a similarity algorithm that compares each generated voiceprint to the reference voiceprint of the first speaker, wherein the similarity score is indicative of the speech in the voiceprint of the speech data chunk belonging to the first speaker. Upon detecting that the audio stream ended, the speech data chunks with voiceprints having respective similarity scores lower than a predefined threshold may be identified by the processor. A representative voiceprint of the second speaker may be generated by the processor using voiceprints of the identified speech data chunks.

In some embodiments of the present invention, the method may include storing the representative voiceprint of the second speaker in a database with representative voiceprints of multiple speakers.

In some embodiments of the present invention, identifying the speech data chunks from the plurality of data chunks may include applying a voice activity detection algorithm to the plurality of data chunks.

In some embodiments of the present invention, the voiceprint may include an i-vector.

In some embodiments of the present invention, the similarity algorithm may use a log likelihood ratio.

In some embodiments of the present invention, the method may include calculating the predefined threshold from a decision boundary of a distribution of the similarity scores for voiceprints generated from the speech data chunks.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments: thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for separating and authenticating speech of a speaker on an audio stream of speakers over an audio channel, the method comprising:

in a processor, receiving audio stream data of an audio stream with speech from a speaker to be authenticated speaking with a second speaker over an audio channel, and representative voiceprints of the speaker to be authenticated and the second speaker;

dividing by the processor the audio stream data into a plurality of data chunks having a predefined time interval;

generating by the processor a voiceprint for each data chunk in said plurality of data chunks in which speech is detected;

successively assessing by the processor the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, incrementing a clock counter by the predefined time interval;

when the clock counter has a time value greater than a predefined threshold, generating by the processor an accumulated voiceprint using the verified data chunks of the speaker to be authenticated; and comparing by the processor the accumulated voiceprint to the representative voiceprint of the speaker to be authenticated, so as to authenticate the speaker speaking with the second speaker over the audio channel, wherein successively assessing the voiceprint for each data chunk comprises computing for the voiceprint of each data chunk, a first similarity score for the speaker to be authenticated and a second similarity score for the second speaker.

2. The method according to claim 1, wherein verifying that the voiceprint for the assessed data chunk has speech belonging to the speaker to be authenticated comprises assessing that the first similarity score is greater than the second similarity score.

3. The method according to claim 1, wherein successively assessing the voiceprint for each data chunk comprises applying a similarity algorithm to the voiceprint for each data chunk.

4. The method according to claim 1, wherein the voiceprint comprises an i-vector.

5. The method according to claim 4, wherein generating the i-vector for each data chunk in said plurality of data chunks comprises:
dividing each data chunk into frames;
extracting Mel-Frequency Cepstrum (MFCC) features for each of the frames; and
extracting the i-vector for each data chunk from the MFCC features for each frame using a universal background model (UBM) and a total variability matrix (TVM).

6. The method according to claim 1, wherein comparing the accumulated voiceprint to the representative voiceprint of the speaker to be authenticated comprises computing a similarity score for the accumulated voiceprint using the representative voiceprint of the speaker to be authenticated.

7. The method according to claim 6, further comprising authenticating the speaker speaking with the second speaker over the audio channel by assessing that the computed similarity score for the accumulated voiceprint is greater than a predefined threshold.

8. The method according to claim 1, further comprising detecting if the speech in the audio stream data belongs to an additional speaker on the audio channel by verifying that the speech in the voiceprints of successive data chunks in a second predefined time interval does not belong to the speaker to be authenticated or to the second speaker.

9. The method according to claim 8, wherein detecting the additional speaker on the audio channel comprises computing, for each of the voiceprints of the successive data chunks, similarity scores for both the speaker to be authenticated and the second speaker and assessing that both similarity scores for each of the voiceprints of the successive data chunks are less than a preset similarity score threshold.

10. The method according to claim 8, further comprising generating a representative voiceprint of the additional speaker by merging the voiceprints of the successive data chunks with the speech of the detected additional speaker.

11. A computerized system for separating and authenticating speech of a speaker on an, audio stream of speakers over an audio channel, the computerized system comprising:
a memory; and
a processor configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment a clock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel,
wherein the processor is configured to successively assess the voiceprint for each data chunk by computing for the voiceprint of each data chunk, a first similarity score for the speaker to be authenticated and a second similarity score for the second speaker.

12. The computerized system according to claim 11, wherein the processor is configured to verify that the voiceprint for the assessed data chunk has speech belonging to the speaker to be authenticated by assessing that the first similarity score is greater than the second similarity score.

13. The computerized system according to claim 11, wherein the processor is configured to successively assess the voiceprint for each data chunk by applying a similarity algorithm to the voiceprint for each data chunk.

14. The computerized system according to claim 11, wherein the voiceprint comprises i-vector.

15. The computerized system according to claim 14, wherein the processor is configured to generate the i-vector for each data chunk in said plurality of data chunks by dividing each data chunk into frames, extracting Mel-Frequency Cepstrum (MFCC) features for each of the frames, and extracting the i-vector for each data chunk from the MFCC features for each frame using a universal background model (UBM) and a total variability matrix (TVM).

16. The computerized system according to claim 11, wherein the processor is configured to compare the accumulated voiceprint to the representative voiceprint of the speaker to be authenticated by computing a similarity score for the accumulated voiceprint using the representative voiceprint of the speaker to be authenticated.

17. The computerized system according to claim 16, wherein the processor is configured to authenticate the speaker speaking with the second speaker over the audio channel by assessing that the computed similarity score for the accumulated voiceprint is greater than a predefined threshold.

18. The computerized system according to claim 11, wherein the processor is configured to detect if the speech in the audio stream data belongs to an additional speaker on the audio channel by verifying that the speech in the voiceprints of successive data chunks in a second predefined time interval does not belong to the speaker to be authenticated or to the second speaker.

19. The computerized system according, to claim 18, wherein the processor is configured to detect the additional speaker on the audio channel by computing, for each of the voiceprints of the successive data chunks, similarity scores for both the speaker to be authenticated and the second speaker and assessing that both similarity scores for each of the voiceprints of the successive data chunks are less than a preset similarity score threshold.

20. The computerized system according to claim 18, wherein the processor is configured to generate a representative voiceprint of the additional speaker by merging the voiceprints of the successive data chunks with the speech of the detected additional speaker.

21. A method for generating a representative voiceprint of a speaker from audio stream data with speech over an audio channel, the method comprising:
- in a processor, receiving audio stream data of an audio stream with speech from a first speaker and a second speaker speaking over an audio channel and a reference voiceprint of the first speaker;
- dividing by the processor the audio stream data into a plurality of data chunks having a predefined time interval;
- distinguishing by the processor data chunks from the plurality of data chunks with speech from the first speaker or the second speaker in the predefined time interval;
- generating by the processor a voiceprint for the speech in each speech data chunk;
- assigning by the processor a similarity score to the voiceprint generated for each speech data chunk by applying a similarity algorithm that compares each generated voiceprint to the reference voiceprint of the first speaker, wherein the similarity score is indicative of the speech in the voiceprint of the speech data chunk belonging to the first speaker;
- upon detecting that the audio stream ended, identifying by the processor the speech data chunks with voiceprints having respective similarity scores lower than a predefined threshold; and
- generating by the processor a representative voiceprint of the second speaker using voiceprints of the identified speech data chunks.

22. The method according to claim 21, further comprising storing the representative voiceprint of the second speaker in a database with representative voiceprints of multiple speakers.

23. The method according to claim 21, wherein identifying the speech data chunks from the plurality of data chunks comprises applying a voice activity detection algorithm to the plurality of data chunks.

24. The method according to claim 21, wherein the voiceprint comprises an i-vector.

25. The method according to claim 21, wherein the similarity algorithm uses a log likelihood ratio.

26. The method according to claim 21, further comprising calculating the predefined threshold from a decision boundary of a distribution of the similarity scores for voiceprints generated from the speech data chunks.

27. A method for separating and authenticating speech of a speaker on an audio stream of speakers over an audio channel, the method comprising:
- in a processor, receiving audio stream data of an audio stream with speech from a speaker to be authenticated speaking with a second speaker over an audio channel, and representative voiceprints of the speaker to be authenticated and the second speaker;
- dividing by the processor the audio stream data into a plurality of data chunks having a predefined time interval;
- generating by the processor a voiceprint for each data chunk in said plurality of data chunks in which speech is detected;
- successively assessing by the processor the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, incrementing a clock counter by the predefined time interval;
- when the clock counter has a time value greater than a predefined threshold, generating by the processor an accumulated voiceprint using the verified data chunks of the speaker to be authenticated; and
- comparing by the processor the accumulated voiceprint to the representative voiceprint of the speaker to be authenticated, so as to authenticate the speaker speaking with the second speaker over the audio channel,
- wherein successively assessing the voiceprint for each data chunk comprises applying a similarity algorithm to the voiceprint for each data chunk.

28. A method for separating and authenticating speech of a speaker on an audio stream of speakers over an audio channel, the method comprising:
- in a processor, receiving audio stream data of an audio stream with speech from a speaker to be authenticated speaking with a second, speaker over an audio channel, and representative voiceprints of the speaker to be authenticated and the second speaker;
- dividing by the processor the audio stream data into a plurality of data chunks having a predefined time interval;
- generating by the processor a voiceprint for each data chunk in said plurality of data chunks in which speech is detected;
- successively assessing by the processor the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, incrementing a clock counter by the predefined time interval;
- when the clock counter has a time value greater than a predefined threshold, generating by the processor an accumulated voiceprint using the verified data chunks of the speaker to be authenticated; and
- comparing by the processor the accumulated voiceprint to the representative voiceprint of the speaker to be authenticated, so as to authenticate the speaker speaking with the second speaker over the audio channel,
- wherein the voiceprint comprises an i-vector.

29. A method for separating and authenticating speech of a speaker on an audio stream of speakers over an audio channel, the method comprising:
- in a processor, receiving audio stream data of an audio stream with speech from a speaker to be authenticated speaking with a second speaker over an audio channel, and representative voiceprints of the speaker to be authenticated and the second speaker;
- dividing by the processor the audio stream data into a plurality of data chunks having a predefined time interval;
- generating by the processor a voiceprint for each data chunk in said plurality of data chunks in which speech is detected;
- successively assessing by the processor the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, incrementing a clock counter by the predefined time interval;

when the clock counter has a time value greater than a predefined threshold, generating by the processor an accumulated voiceprint using the verified data chunks of the speaker to be authenticated; and comparing by the processor the accumulated voiceprint to the representative voiceprint of the speaker to be authenticated, so as to authenticate the speaker speaking with the second speaker over the audio channel, wherein comparing the accumulated voiceprint to the representative voiceprint of the speaker to be authenticated comprises computing a similarity score for the accumulated voiceprint using the representative voiceprint of the speaker to be authenticated.

30. A method for separating and authenticating speech of a speaker on an audio stream of speakers over an audio channel, the method comprising:

in a processor, receiving audio stream data of an audio stream with speech from a speaker to be authenticated speaking with a second speaker over an audio channel, and representative voiceprints of the speaker to be authenticated and the second speaker;

dividing by the processor the audio stream data into a plurality of data chunks having a predefined time interval;

generating by the processor a voiceprint for each data chunk in said plurality of data chunks in which speech is detected;

successively, assessing by the processor the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk: as speech belonging to the speaker to be authenticated, incrementing a clock counter by the predefined time interval;

when the clock counter has a time value greater than a predefined threshold, generating by the processor an accumulated voiceprint using the verified data chunks of the speaker to be authenticated; and comparing by the processor the accumulated voiceprint to the representative voiceprint of the speaker to be authenticated, so as to authenticate the speaker speaking with the second speaker over the audio channel; and detecting if the speech in, the audio stream data belongs to an additional speaker on the audio channel by verifying that the speech in the voiceprints of successive data chunks in a second predefined time interval does not belong to the speaker to be authenticated or to the second speaker.

31. A computerized system for separating and authenticating speech of a speaker on an audio stream of speakers over an audio channel, the computerized system comprising:

a memory; and a processor configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment a dock counter by the predefined time interval, to generate an accumulated voiceprint using the verified data chunks of the speaker to be authenticated when the dock counter has a time value greater than a predefined threshold, and to compare the accumulated voiceprint to the representative voiceprint of the speaker to be authenticated, so as to authenticate the speaker speaking with the second speaker over the audio channel, wherein the processor is configured to successively assess the voiceprint for each data chunk by applying a similarity algorithm to the voiceprint for each data chunk.

32. A computerized system for separating and authenticating speech of a speaker on an audio stream of speakers over an audio channel, the computerized system comprising:

a memory; and a processor configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the verifying for the assessed data chunk has speech belonging to the speaker to be authenticated, to increment a clock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel, wherein the voiceprint comprises an i-vector.

33. A computerized system for separating and authenticating speech of a speaker on an audio stream of speakers over an audio channel, the computerized system comprising:

a memory; and a processor configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment a dock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel, wherein the processor is configured to compare the accumulated voiceprint to the representative voiceprint of the speaker to be authenticated by computing a similarity score for the accumulated voiceprint using the representative voiceprint of the speaker to be authenticated.

34. A computerized system for separating and authenticating speech of a speaker on an audio stream of speakers over an audio channel, the computerized system comprising:
a memory; and
a processor configured to receive audio stream data of an audio stream with speech from a speaker to be authenticated speaking with a second speaker over an audio channel, and representative voiceprints of the speaker to be authenticated and the second speaker, to divide the audio stream data into a plurality of data chunks having a predefined time interval, to generate a voiceprint for each data chunk in said plurality of data chunks in which speech is detected, to successively assess the voiceprint for each data chunk from a start of the audio stream data as to whether the voiceprint for each data chunk has speech belonging to the speaker to be authenticated or to the second speaker using the representative voiceprints, and upon verifying that the voiceprint for the assessed data chunk has speech belonging to the speaker to be authenticated, to increment a clock counter by the predefined time interval, to generate an accumulated voiceprint using the verified data chunks of the speaker to be authenticated when the clock counter has a time value greater than a predefined threshold, and to compare the accumulated voiceprint to the representative voiceprint of the speaker to be authenticated, so as to authenticate the speaker speaking with the second speaker over the audio channel, wherein the processor is configured to detect if the speech in the audio stream data belongs to an additional speaker on the audio channel by verifying that the speech in the voiceprints of successive data chunks in a second predefined time interval does not belong to the speaker to be authenticated or to the second speaker.

* * * * *